April 1, 1969 R. F. TSCHANNEN 3,436,592

FOCUS CONTROL APPARATUS

Filed June 11, 1965

3,436,592
Patented Apr. 1, 1969

3,436,592

FOCUS CONTROL APPARATUS

Robert F. Tschannen, Lombard, Ill., assignor to Hazeltine Research, Inc., a corporation of Illinois Filed June 11, 1965, Ser. No. 463,086
Int. Cl. H01j *29/56*
U.S. Cl. 315—31 4 Claims

ABSTRACT OF THE DISCLOSURE

The cathode-ray tube focus apparatus of this invention includes a high voltage vacuum tube rectifier capacitively coupled to a focus voltage rectifier. A conductive metal band surrounding and in contact with the high voltage rectifier produces the capacitive coupling to the focus rectifier and the cathode ray tube focus electrode is coupled to the output of the focus rectifier through a resistor.

Figure 1:
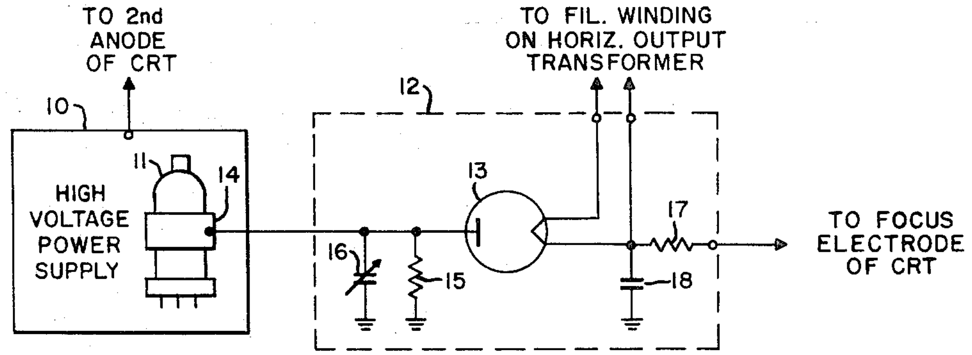

The present invention relates, in general, to focus control apparatus for use in a television receiver. More particularly, the invention concerns focus control apparatus coupled to the high voltage power supply of a television receiver for deriving a focus voltage which automatically tracks variations in the high voltage. While the present invention has use in both monochrome and color-television receivers, its advantages will be more readily recognized and appreciated in conjunction with its use in color receivers.

In prior art color-television receivers which utilize electrostatic focusing of the electron beams in the cathode-ray tube (CRT), it has heretofore been necessary to provide a high voltage power supply having a high degree of voltage regulation. That is, such that the developed high voltage fed to the second anode of the CRT is subject to little, if any, variation due to variations in beam current, for example. This was necessary since otherwise variations in high voltage would cause attendant changes in the focus voltage-high voltage ratio ($E_F$:$E_{HV}$), causing the electron beams of the CRT to become seriously defocused in accordance with changes in this ratio. This, of course, follows from the fact that increased high voltage causes greater electron velocity, which necessitates a greater focusing effect and therefore a higher focus voltage, and vice versa. To alleviate this problem, it has become conventional to include a shunt voltage regulator stage in the high voltage power supply in order to provide an output high voltage which remains relatively constant, regardless of variations in beam current, for example. Voltage regulators of this type must necessarily be capable of providing a high degree of regulation over a relatively wide range of operation, and are therefore, complex and expensive.

It would be advantageous, therefore, if the amount of regulation required could be reduced so that the voltage regulator stage could be of simpler, more economical design. Or, even further, it would be ideal if the voltage regulator stage could be eliminated altogether from the high voltage power supply. This could only be obtained where a focus voltage is provided which tracks variations in the developed high voltage, since so long as the proper ratio is maintained between focus voltage and high voltage, focus will not be affected.

It is therefore an object of the present invention to provide focus control apparatus for use in a television receiver for developing a focus voltage which automatically maintains focus over a wide range of high voltage variations.

It is another object of the present invention to provide focus control apparatus for use in a television receiver for deriving a focus voltage from the high voltage power supply in a novel manner, such that said focus voltage automatically tracks variations in the high voltage.

In accordance with the present invention, focus control apparatus for use in a television receiver, comprises a high voltage power supply and means coupled to the power supply and responsive to variations in the high voltage developed thereby, for deriving a focus voltage for maintaining focus over a range of high voltage variations.

For a better understanding of the present invention together with other and further objects thereof, reference is had to the following description taken in connection with the accompanying drawing, and its scope will be pointed out in the appended claims.

Figure 2:
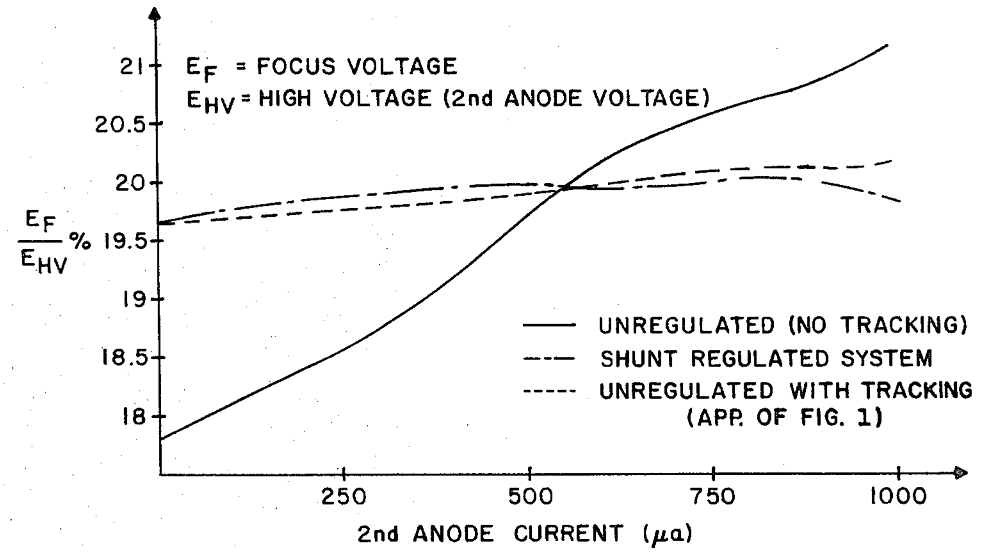

Referring to the drawings:

FIG. 1 is a schematic diagram of apparatus embodying the invention in one form, and FIG. 2 is a graphical diagram useful in explaining the operation of the apparatus of FIG. 1.

*Description of the apparatus of FIG. 1*

As shown, the apparatus of FIG. 1 includes a suitable television receiver high voltage power supply 10, which may be of generally conventional design and construction, including a high voltage rectifier, which in this case is a conventional vacuum tube rectifier 11. In accordance with one embodiment of the present invention, high voltage power supply 10 may be unregulated. That is, power supply 10 may be constructed without the shunt voltage regulator stage normally included in prior art color-television high voltage power supplies.

The apparatus of FIG. 1 also includes means shown as the dotted box 12, coupled to power supply 10 and responsive to variations in the high voltage developed thereby, for deriving a focus voltage for maintaining focus over a range of high voltage variations.

Means 12 includes a suitable rectifier, shown in this case as being a conventional vacuum tube rectifier 13. In accordance with the present invention, the anode of rectifier 13 is capacitively coupled to the high voltage rectifier 11 in power supply 10. In the present example, this capacitive coupling consists simply of a conductive metal band placed around the insulating glass envelope of the high voltage rectifier 11 and insulated from all active elements of rectifier 11. Band 14 then is directly connected to the anode of rectifier 13. In addition, there is coupled between the anode of rectifier 13 and ground, the parallel combination of a resistor 15 and a variable capacitor 16.

The filament-cathode of rectifier 13 is coupled in a conventional manner to a suitable filament winding (not shown) provided on the horizontal output transformer of the television receiver in which the apparatus of FIG. 1 is used. As shown in FIG. 1, the output of the apparatus is taken at the cathode of rectifier 13, which is coupled through resistance 17 to the focus electrode of a cathode-ray tube in the television receiver. In addition, a filtering capacitor 18 is coupled between the cathode of rectifier 13 and ground.

While in the embodiment of FIG. 1 the capacitive coupling to high voltage rectifier 11 is achieved by placing a metal band around the glass envelope of the rectifier tube, this is not the only form of capacitive coupling which can be used. For example, a special high voltage vacuum tube rectifier could be manufactured with a coupling element, such as band 14, located inside the tube envelope, in which case, connection to the coupling element could be made at a pin in the tube base, or via a pin brought through the tube envelope.

Also, while in the embodiment of FIG. 1, both rectifier 11 and rectifier 13 are shown as being vacuum tube rectifiers, either, or both, can be of the solid-state type. Where rectifier 11 is selected to be a solid state device, capacitive coupling to it can be provided, for example, by way of a fixed capacitance coupled to its anode, or by way of a conductive metal band slipped over the anode shell of the rectifier and insulated therefrom by a suitable dielectric.

It will be appreciated, however, that the metal band used to provide capacitive coupling to rectifier 11 in the embodiment of FIG. 1 is a simple and inexpensive way of achieving the desired coupling, since the glass tube envelope supplies the necessary insulating dielectric for the coupling capacitance. Nevertheless, using the basic teachings of the present invention, those skilled in the art will be able to construct other suitable means for providing the required coupling.

*Operation of the apparatus of FIG.* 1

In operation, due to the capacitive coupling effect between band 14 and the anode of rectifier 11, a voltage will be developed on band 14 which is proportional to the voltage of the pulses supplied to the anode of high voltage rectifier 11 in power supply 10, and therefore proportional to the high voltage developed at the cathode of rectifier 11. It will be appreciated that any variation in the peak amplitude of the pulses present at the anode of rectifier 11 causes a directly corresponding variation in the voltage developed on band 14.

The effective capacitance of band 14, together with variable capacitor 16, form a capacitive voltage divider, such that the voltage developed across resistance 15 and applied to the anode of rectifier 13 may be additionally controlled by varying the capacitance of capacitor 16. In this way, variable capacitor 16 serves as a focus control for initially adjusting the focus voltage developed at the output of means 12.

The voltage pulses applied to the anode of rectifier 13 are rectified and smoothed in a conventional manner to develop a D-C voltage which is fed to the focus electrode of a cathode-ray tube through resistance 17. Since focus current is negligible, the voltage appearing at the output of means 12 in FIG. 1 is a D-C voltage proportional to the high voltage developed in power supply 10. Thus, as mentioned previously, it will be appreciated that any variation in the high voltage will be present in the same proportions in the focus voltage developed by means 12. In this manner, the focus voltage is made to track variations in the high voltage for maintaining focus over a range of high voltage variations.

An example of the wide extent of the aforementioned range is shown in the graph of FIG. 2, which illustrates the operational characteristics of actual apparatus constructed in accordance with the embodiment of FIG. 1, in comparison with those of conventional apparatus.

While it is not meant to limit the present invention in any way, the following component values have been found to produce satisfactory results in actual operation of apparatus constructed in accordance with the embodiment of FIG. 1.

| | |
|---|---|
| Rectifier **11** | 3A3 |
| Rectifier **13** | 1V2 |
| Resistor **15** ——megohms | 100 |
| Resistor **17** ——do | 1 |
| Capacitor **18** ——micromicrofarads | 10–100 |
| Variable capacitor **16** ——do | 1–5 |
| Band **14**[1] | |

[1] Adjusted to provide approximately 1 micromicrofarad capacitance to rectifier anode.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. Focus control apparatus for use in a television receiver, comprising:

a high voltage power supply for developing a high voltage output subject to undesirable variations; and means, including a focus voltage rectifier coupled to said power supply and responsive to variations in the high voltage developed thereby, for deriving a direct current focus voltage which varies in accordance with variations in said high voltage for maintaining focus over a range of high voltage variations.

2. Focus control apparatus for use in a television receiver, comprising:

a high voltage power supply including a high voltage rectifier for developing a direct current high voltage output subject to undesirable variations; and means, including a focus voltage rectifier coupled to said high voltage rectifier and responsive to variations in the high voltage developed thereby for deriving a direct curr entfocus voltage which varies in accordance with variations in said high voltage for maintaining focus over a range of high voltage variations.

3. Focus control apparatus for use in a television receiver, comprising:

a high voltage power supply including a high voltage rectifier for developing a direct current high voltage output subject to undesirable variations; and means, including a focus voltage rectifier capacitively coupled to said high voltage rectifier and responsive to variations in the high voltage developed thereby, for deriving a direct current focus voltage which varies in accordance with variations in said high voltage for maintaining focus by maintaining the ratio of said focus voltage to said high voltage relatively constant over a range of high voltage variations.

4. Focus control apparatus for use in a television receiver comprising:

an unregulated high voltage power supply including a glass envelope vacuum tube high voltage rectifier for developing a direct current high voltage output subject to undesirable variations; and means, including a focus voltage rectifier capacitively coupled to said high voltage vacuum tube rectifier via a conductive metal band surrounding and in contact with the exterior surface of the envelope of said vacuum tube rectifier and responsive to variations in the high voltage developed thereby, for deriving a direct current focus voltage which varies in accordance with variations in said high voltage for maintaining focus by maintaining the ratio of said focus voltage to said high voltage relatively constant over a range of high voltage variations.

References Cited

UNITED STATES PATENTS

| | | | |
|---|---|---|---|
| 2,494,457 | 1/1950 | Stolze | 315—31 X |
| 2,939,042 | 5/1960 | Fathauer | 315—31 |
| 3,168,679 | 2/1965 | Kobbe | 315—31 |
| 3,339,103 | 8/1967 | Denton | 315—31 |
| 3,350,600 | 10/1967 | Hannan | 315—31 |

RICHARD A. FARLEY, *Primary Examiner.*

M. F. HUBLER, *Assistant Examiner.*